Figures 1, 2:
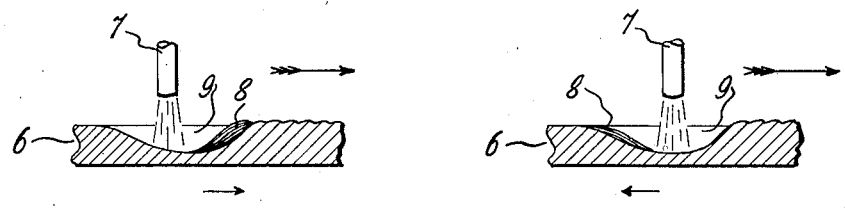

Oct. 8, 1935.  W. R. HUME  2,017,003

ART OF ELECTRIC ARC WELDING

Filed Jan. 2, 1935

Inventor:
Walter Reginald Hume
By
Attorney

Patented Oct. 8, 1935

2,017,003

UNITED STATES PATENT OFFICE

2,017,003

ART OF ELECTRIC ARC WELDING

Walter Reginald Hume, Melbourne, Victoria, Australia, assignor to Hume Steel Limited, Melbourne, Victoria, Australia Application January 2, 1935, Serial No. 130
In Australia August 21, 1934

19 Claims. (Cl. 219—8)

This invention relates to the art of electric arc welding and refers more particularly to a new or improved method or process of automatic arc welding which involves the forced displacement or control of flow of the molten metal upon the work piece during welding operations, whereby several important advantages are obtained including amongst others increased and uniform penetration of the arc into the work piece or parent metal, liberation of undesired gases from the molten metal, the avoidance of overheating the molten metal, and the formation of welds of increased strength, homogeneity and stability.

In the automatic arc welding of sheet metal pipes and other objects, it is customary to feed or traverse the work beneath the electrode, or to traverse the electrode along the work. It has also been the practice, particularly in connection with hand welding operations, for the operator to move the electrode backwards and forwards while traversing it along the work in order to cover a larger area of the work.

Welding in accordance with such previous practices possesses a number of disadvantages such as the difficulty of controlling the flow of the molten metal, and the insufficient and irregular penetration of the arc preventing the desired uniformity and maximum strength of the welded joint.

The arc causes a crater to be formed in the work piece and the molten metal accumulates in the crater as a pool immediately beneath the electrode, with the result that the molten metal prevents or minimizes penetration of the arc into the underlying parent metal. Furthermore, the pool of molten metal being continuously subjected to the direct influence of the arc is excessively heated and escape of undesired gases is impeded with the result that minute holes are likely to appear in the finished weld to the detriment of its strength and durability.

I have discovered that the above and other disadvantages are eliminated or minimized and certain additional advantages secured by causing the molten metal to be forcibly displaced upon the work piece from its normal position beneath the electrode whereby the work piece or parent metal is exposed to the direct influence of the arc which may thus penetrate to the maximum extent into the work piece. Furthermore, by displacing the molten metal from its normal position immediately beneath the electrode overheating of the molten metal is avoided.

The molten metal is preferably caused to reciprocate or oscillate along the line of the weld being formed, and thus to flow back and forth in the crater of the work piece past the electrode. As a result of such reciprocation, the molten metal is agitated whereby escape of undesired gases therefrom is facilitated. Moreover, due to such reciprocation or oscillation, the fused metal of the electrode and the fused metal of the work piece are effectively mixed with each other and form an alloy weld which is substantially homogeneous. Another advantage of such reciprocation of the molten metal is that, due to the resultant periodical contact of the molten metal with the cool or unwelded portion of the work piece, the latter is pre-heated before it arrives immediately beneath the electrode.

Reciprocation of the molten metal may be effected in any suitable manner. Preferably, however, it is effected by reciprocating the work piece while it is being traversed in relation to the electrode. The forward stroke of such reciprocation of the work piece may be effected at a higher rate of speed than the return stroke in order to accentuate forward flow of the molten metal so that the molten metal tends to bank up in the crater at the welded side thereof. For similar reasons, the forward stroke of the reciprocation of the work piece may be abruptly terminated. This also tends to assist the mixing together of the fused metal of the electrode and the fused metal of the work piece.

The above and other objects and features of the invention and the advantages arising therefrom will, however, be more readily appreciated from the following description aided by the accompanying drawing which illustrates one mode of carrying the invention into effect wherein displacement of the molten metal is effected by reciprocating the work piece as it is being traversed beneath an electrode.

Referring to the drawing which forms part of this specification:—

Figure 1 is a fragmentary section of a work piece taken approximately along the line of the weld being formed, and showing the approximate disposition of the molten metal at or near the end of the forward stroke of the reciprocation of the work piece.

Figure 2 is a view similar to Figure 1 but in which it is assumed that the work piece is moving backwardly on the return stroke of its reciprocation. In Figures 1 and 2, the barbed arrows indicate the direction of traversing or feeding movement of the work, while the unbarbed arrows indicate the direction of the forward and backward strokes respectively of the reciprocating movement of the work piece.

Figure 3:
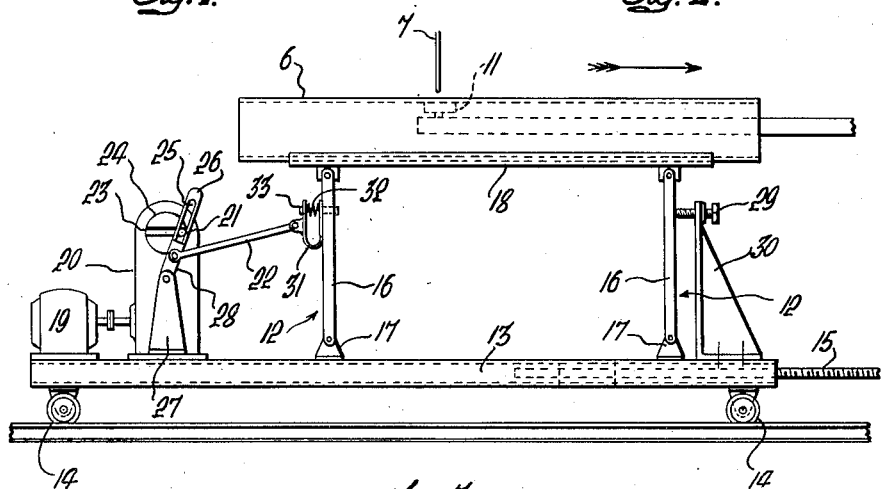
Figure 4:
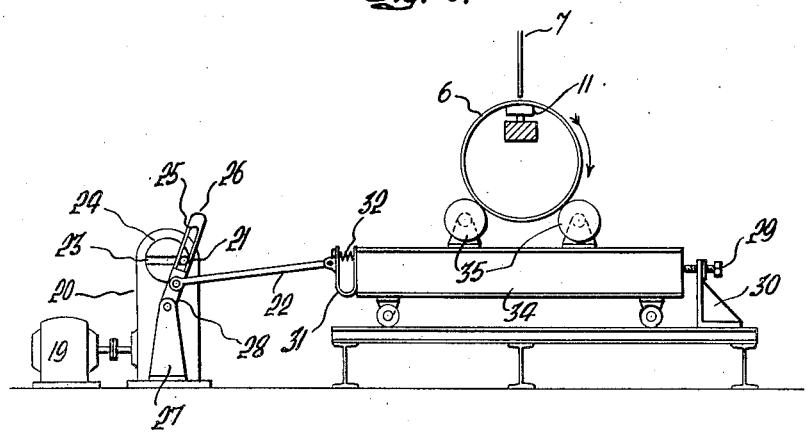

Figures 3 and 4 are elevations of apparatus suitable for carrying the invention into effect.

Referring more particularly to Figures 1 and 2, the numeral 6 indicates the work piece which, it is assumed, is being constantly traversed in the direction of the barbed arrow past a fusible electrode 7 which is being fed downwardly towards the work piece. As before stated, the displacement of the molten metal from beneath the electrode is preferably effected by reciprocating the work piece simultaneously with its traversing movement past the electrode, the forward stroke of the reciprocating movement being preferably terminated abruptly and accompanied by a slight jolt or impact. Thus during the forward stroke of the reciprocation of the work piece, the molten metal 8 moves forwardly and banks up in the crater 9 at the forward side of the electrode somewhat as indicated in Figure 1. During the backward stroke of the reciprocation of the work piece, the molten metal moves rearwardly within the crater somewhat as indicated in Figure 2.

The molten metal 8 thus flows to and fro in the crater 9 past the electrode whereby the work piece is repeatedly exposed to the direct influence of the arc so that maximum penetration is obtained. Furthermore, as the arc does not continuously play upon the molten metal as is the case in usual practice, the molten metal is not overheated.

The agitation or turbulence resulting from the reciprocation of the molten metal facilitates the liberation of undesired gases which may thus readily escape. It will also be evident that during the backward movement of the molten metal the cool or unwelded portion of the work piece is preheated before it arrives beneath the electrode.

The metal fused from the electrode and the metal fused from the work piece are effectively mixed with each other by the reciprocating action so that an alloy weld of maximum strength and durability is obtained.

In using a powdered flux in connection with arc welding operations, it is usual to deposit the flux immediately behind the electrode, that is to say, onto the part of the work which has not yet been welded and is consequently comparatively cool. This has the great disadvantage of covering up the joint and rendering it invisible to the welder. In accordance with the present invention the flux may be deposited in front of the electrode, that is to say, on the part of the work which has just been welded and is consequently heated. Thus the joint is clearly visible to the welder and as the molten metal is displaced by the reciprocatory or like movement it readily takes up the flux and imparts an insulating effect to the weld.

A still further advantage obtainable by the invention is that by traversing the work piece past the electrode and a backing member 11 which engages the under side of the work piece in alignment with the electrode (as in Figures 3 and 4) and by reciprocating the work piece during its traversing movement, the softened or semi-plastic metal at the underside of the work piece is smoothed or ironed out by frictional contact with the backing member.

The reciprocatory or like movement may be imparted to the work piece during the traversing thereof by any suitable means. For example, the work piece, which in Figure 3 is represented as a pipe blank, the longitudinal edges of which are to be welded together, may be supported by a rocking frame 12 mounted upon a carriage 13 having wheels 14 and screw gear 15 or other suitable means whereby it, the work and the work reciprocating means hereinafter referred to may be traversed beneath the electrode. The rocking frame may include two legs 16, pivoted at their lower ends to brackets or lugs 17 on the carriage 13, and having at their upper ends a cradle 18 or the like upon which the work piece may rest and if necessary be detachably retained. According to Figure 3 an electric motor 19 is mounted on the carriage 13 and drives, through the medium of reduction gearing in a casing 20 also mounted on the carriage, a crank 21 from which a connecting rod 22 extends to one of the legs of the rocking frame. In order to provide for a relatively quick forward stroke of the work piece and a relatively slow return stroke the crank pin 21 may be slidably accommodated in a diametrical slot 23 of a wrist plate or disc 24 on the driven shaft of the reduction gearing and project into a longitudinally elongated slot 25 of an arm 26 of a lever pivoted to a bracket 27 on the carriage 13. One end of the rod 22 may be connected to another arm 28 of the lever.

A stop, which may be of an adjustable nature and consist of a screw 29 passing through a bracket 30 upstanding from the carriage 13, may be positioned so as to be engaged by the other leg of the rocking frame at the end of each forward stroke thereof. The forward stroke is thus abruptly terminated by a jolt or impact which results in the forward flow of the molten metal being accentuated. The rod 22 is preferably connected to the rocking frame by a lost motion device in order to provide a pause between each forward stroke and the next succeeding return stroke whereby the arc is for an appreciable period concentrated upon the exposed parent metal while the work piece is substantially stationary. The lost motion device illustrated comprises a U shape spring plate 31 one leg of which is secured to a leg of the rocking frame and the other attached to the respective end of the connecting rod 22. A spiral spring 32 may extend between the outer ends of the U shape spring plate, while a keeper 33 may be provided to limit opening or expansion of the U plate.

The work piece of Figure 4 is assumed to represent comparatively short pipe sections to be joined by circumferential welding to form longer pipes. In such cases the reciprocating mechanism may be similar to that of Figure 3 and connected by a lost motion device to a wheeled carriage 34 having rollers 35 for supporting the work which may be rotated by any suitable means in the direction indicated by the arrow. A stop device 29, 30 similar to that of Figure 3 may be stationarily mounted so as to be periodically engaged by the carriage 34 and thus abruptly terminate the forward stroke thereof.

Having now described my invention what I claim as new and desire to secure by Letters Patent is:—

1. The improvement in the art of electric arc welding which consists in causing a pool of molten metal formed beneath the electrode to be forcibly reciprocated or oscillated in the crater of the work piece past the arcing tip of the electrode so that the displacement of the molten metal repeatedly exposes the work piece to the direct influence of the arc and thereby permits of greater penetration, obviates overheating of the molten metal and creates positive agitation in the molten metal which results in the escape of undesired gases from the molten metal.

2. The improvement in the art of electric arc welding which consists in causing the fused metal of the electrode and the fused metal of the work piece to reciprocate or oscillate in the crater of the work piece past the arcing tip of the electrode and lengthwise of the joint being formed during the welding operations in order to mix with each other and form an alloyed weld.

3. The improvement in the art of electric arc welding as claimed in claim 19, in which said displacement of the molten metal is effected by reciprocating or oscillating the work piece in a direction parallel to the line of the joint being formed.

4. The improvement in the art of electric arc welding which comprises effecting traversing movement between a work piece and a welding electrode and, simultaneously with said traversing movement, reciprocating said work piece in a direction parallel to said traversing movement to cause molten metal to be reciprocated upon the work piece along the line of the joint being formed.

5. The improvement in the art of electric arc welding as claimed in claim 4, comprising abruptly terminating the forward stroke of the reciprocating movement of the work piece.

6. The improvement in the art of electric arc welding as claimed in claim 4, comprising abruptly terminating the forward stroke of the reciprocating movement of the work piece and by arranging for a pause to occur in such reciprocating movement between the termination of each forward stroke and the next return stroke.

7. The improvement in the art of electric arc welding as claimed in claim 4 comprising effecting the forward strokes of the reciprocating movement of the work piece at a higher speed than that of the return strokes.

8. The improvement in the art of electric arc welding which consists in traversing a work piece past an electrode and a backing member which engages the underside of the work piece in alignment with said electrode, and in reciprocating the work piece during its traversing movement, whereby the softened or heated metal at the underside of the work piece is smoothed or ironed out by frictional contact with said backing member.

9. In electric arc welding apparatus the combination with means for effecting relative movement between a welding electrode and a work piece, of means for forcibly reciprocating the molten metal along the work piece in a direction parallel to said relative movement to cause the molten metal to alternately shift from a position in advance to a position to the rear of the electrode.

10. In electric arc welding apparatus the combination with means for effecting relative movement between a welding electrode and a work piece, of means for reciprocating said work piece during such relative movement along the line of said relative movement in order to cause the molten metal to be reciprocated longitudinally of the crater in the work piece so that it repeatedly passes the arcing tip of the electrode.

11. In electric arc welding apparatus the combination with means for traversing a work piece past a welding electrode of means for reciprocating said work piece along the line of and simultaneously with said traversing movement in order to cause the molten metal to be reciprocated upon the work piece along the line of the weld being formed.

12. In electric arc welding apparatus the combination claimed in claim 11, in which said reciprocating means is adapted to effect the forward stroke of the reciprocating movement of the work piece at a quicker rate than the return stroke.

13. In electric arc welding apparatus the combination claimed in claim 11 in combination with a device arranged to abruptly terminate the forward stroke of the reciprocating movement of the work piece.

14. In electric arc welding apparatus the combination claimed in claim 11, in combination with a device arranged to abruptly terminate the forward stroke of the reciprocating movement of the work piece, and a lost motion device associated with said work piece reciprocating means adapted to cause a pause in the reciprocating movement to occur between the termination of each forward stroke and the next return stroke.

15. In electric arc welding apparatus a carriage adapted to be traversed past a welding electrode, a frame mounted on said carriage and adapted to support a work piece during welding, and means carried by said carriage for reciprocating said frame and the work piece thereon along the line of the traversing movement of the carriage.

16. In electric arc welding apparatus the combination claimed in claim 15, in combination with a stop device mounted on said carriage and adapted to abruptly terminate the forward stroke of the reciprocation of said work supporting frame, and a lost motion device connecting said reciprocating means to said frame.

17. In electric arc welding apparatus a carriage, means on said carriage for supporting a work piece so that it may be rotated in relation to a welding electrode, and means for reciprocating said carriage and the rotating work thereon.

18. In electric arc welding apparatus the combination claimed in claim 17 in combination with a stop device adapted to abruptly terminate the forward stroke of the reciprocating carriage and a lost motion device connecting said reciprocating means to said carriage.

19. The improvement in the art of electric arc welding which consists in causing molten metal to reciprocate or oscillate in the crater of the work piece so that it travels back and forth along the line of the joint being formed, whereby the work piece is exposed to the direct influence of the arc to obtain increased penetration, the molten metal is prevented from overheating, and, at or during each change in direction of its travel, the molten metal automatically receives positive agitation that results in the escape of undesired gases or entrapments therefrom.

WALTER REGINALD HUME.